United States Patent
Gong et al.

(10) Patent No.: US 11,327,497 B2
(45) Date of Patent: May 10, 2022

(54) AUTONOMOUS TRANSPORTATION VEHICLE IMAGE AUGMENTATION

(71) Applicants: VOLKSWAGEN AG, Wolfsburg (DE); AUDI AG, Ingolstadt (DE); PORSCHE AG, Stuttgart (DE)

(72) Inventors: Xinwei Gong, Mountain View, CA (US); Sai Prasad Nooka, Foster City, CA (US)

(73) Assignees: Volkswagen AG; Audi AG; Porsche AG

(*) Notice: Subject to any disclaimer, the term of this patent is extended or adjusted under 35 U.S.C. 154(b) by 452 days.

(21) Appl. No.: 16/448,497

(22) Filed: Jun. 21, 2019

(65) Prior Publication Data
US 2020/0401150 A1    Dec. 24, 2020

(51) Int. Cl.
| | |
|---|---|
| *G01C 22/00* | (2006.01) |
| *G05D 1/00* | (2006.01) |
| *G05D 1/02* | (2020.01) |
| *G01C 21/36* | (2006.01) |
| *G06N 3/08* | (2006.01) |
| *G06T 19/00* | (2011.01) |
| *B60W 60/00* | (2020.01) |

(52) U.S. Cl.
CPC ......... *G05D 1/0221* (2013.01); *B60W 60/001* (2020.02); *G01C 21/365* (2013.01); *G05D 1/0088* (2013.01); *G06N 3/08* (2013.01); *G06T 19/006* (2013.01); *B60W 2420/42* (2013.01); *G05D 2201/0213* (2013.01)

(58) Field of Classification Search
CPC ............... G05D 1/0221; G05D 1/0088; G05D 2201/0213; B60W 60/001; B60W 2420/42; G01C 21/365; G06N 3/08; G06T 19/006
See application file for complete search history.

(56) References Cited

U.S. PATENT DOCUMENTS

| | | |
|---|---|---|
| 10,034,630 B2 | 7/2018 | Lee et al. |
| 2013/0144521 A1* | 6/2013 | Mathieu ............ G06K 9/00832 701/410 |
| 2019/0113927 A1* | 4/2019 | Englard .............. G05D 1/0231 |
| 2020/0180612 A1* | 6/2020 | Finelt .................. G05D 1/0246 |
| 2020/0193808 A1* | 6/2020 | Guan .................. G08G 1/0125 |
| 2020/0257301 A1* | 8/2020 | Weiser .............. G01C 21/3407 |
| 2021/0188266 A1* | 6/2021 | Xu ........................ G05D 1/0212 |

FOREIGN PATENT DOCUMENTS

WO    2018232680 A1    12/2018

OTHER PUBLICATIONS

Bansal et al.; ChauffeurNet: Learning to Drive by Imitating the Best and Synthesizing the Worst; Cornell University Library; Dec. 7, 2018; Sections 5 and 6.

(Continued)

*Primary Examiner* — Abby Y Lin
*Assistant Examiner* — Sohana Tanju Khayer
(74) *Attorney, Agent, or Firm* — Barnes & Thornburg, LLP

(57) ABSTRACT

Devices, systems, and methods related to autonomous transportation vehicle operation may include image augmentation arrangements for training and/or evaluating autonomous operations. Such augmentations may include artificial impressions of driving conditions which can prompt recovery operations.

25 Claims, 8 Drawing Sheets

(56) References Cited

OTHER PUBLICATIONS

Pomerleau; Neural Network Vision for Robot Driving; Intelligent Unmanned Ground Vehicles; Jan. 1997; pp. 53-72.
Search Report for International Patent Application No. PCT/EP2020/066673; dated Oct. 1, 2020.
Bojarski et al.; End to End Learning for Self-Driving Cars; Apr. 25, 2016; downloaded from https://arxiv.org/pdf/1604.07316,pdf.
Chen et al.; DeepDriving: Learning Affordance for Direct Perception in Autonomous Driving; Proceedings of 15th IEEE International Conference on Computer Vision; 2015.
Chen; Computer Vision and Machine Learning for Autonomous Vehicles; Chapter 7, End-to-End Learning for Lane Keeping of Self-Driving Cars; pp. 109-123; Dissertation; Worcester Polytechnic Institute; Aug. 2017.

* cited by examiner

AUTONOMOUS TRANSPORTATION VEHICLE IMAGE AUGMENTATION

FIELD

The present disclosure relates to systems, components, and methodologies for autonomous transportation vehicles. More particularly, the present disclosure relates to systems, components, and methodologies for autonomous transportation vehicle operations.

BACKGROUND

Designing and/or implementing autonomous transportation vehicle operations can consider image techniques. For example, transportation vehicle vision systems may assess images as the basis for decision making in autonomous operations. However, adequately training and/or evaluating autonomous systems on the basis of the image data available can be an extensive and/or challenging. Moreover, discerning quality information from image data for use in training and/or evaluating autonomous systems can present challenges.

SUMMARY

Disclosed embodiments provide an autonomous transportation vehicle and included control system for such a vehicle. In accordance with disclosed embodiments, the control system may conduct shadow mode autonomous guidance of a guidance system of the vehicle. In accordance with disclosed embodiments, the control system may generate simulated autonomous guidance of a drive system of the vehicle while a human driver conducts actual guidance of the drive system.

In accordance with disclosed embodiments, such a control system may include at least one processor for executing instructions stored on a memory for determining shadow mode autonomous guidance operations. In accordance with disclosed embodiments, such a control system may be configured to receive one or more captured images from the image capture device indicating an actual course of travel of the autonomous transportation vehicle and may be configured to augment at least one of the one or more captured images to impose an artificial perception of a shadow mode course of travel corresponding to actualization of the shadow mode autonomous guidance of the drive system.

In accordance with disclosed embodiments, such a control system may be further configured to determine a remedial course of travel for returning to the actual course of travel from the shadow mode course of travel, and may be configured to determine at least one revision to the instructions based on the remedial course of travel to train the control system according to the artificial perception.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Transportation vehicles for autonomous operation, whether assistive, partly or fully autonomous, are increasing in popularity and sophistication. Autonomous operations for transportation vehicles can benefit from considerable development and/or testing of the decision-making process(es) for autonomous operation. For example, before autonomous operation begins, transportation vehicles applying a neural network often perform considerable training operations to "teach" the neural network how to approach management of real world scenarios.

Moreover, testing and/or evaluation of the trained and operable neural network, can be performed to enhance autonomous operations. Often such evaluation can be performed by human driver operation of the transportation vehicle while the autonomous systems of the transportation vehicle operate in a "shadow mode" in which the autonomous systems develop an mock course of action at each stage of driving for later evaluation. Such shadow mode testing may be performed for thousands of miles of driving in development of autonomous systems.

However, training and/or testing in real world scenarios can face practical challenges. For example, training and/or testing from exemplary desirable driving operations can omit consideration of the factors that can occur in undesirable scenarios, such as when a transportation vehicle veers too far from the center of its lane of travel and/or unreasonably askew from its lane of travel. Furthermore, shadow mode testing can be limited to the observable information available from the human driver operation.

An additional concern in shadow mode testing is the amount of information storage required for later use. Of course, the amount of data recorded can face practical limitations, such as cost. Yet, applying discretion in the selection of which information is important to retain, for example, information which is useful in refining autonomous operation, can address such practical data storage issues while tailoring the test result information to develop useful evaluations. By modifying captured images, the range of available scenarios depicted by the image data can be expanded to refine the training and/or testing input information to assist in enhancing autonomous vehicle operations.

Figure 1:
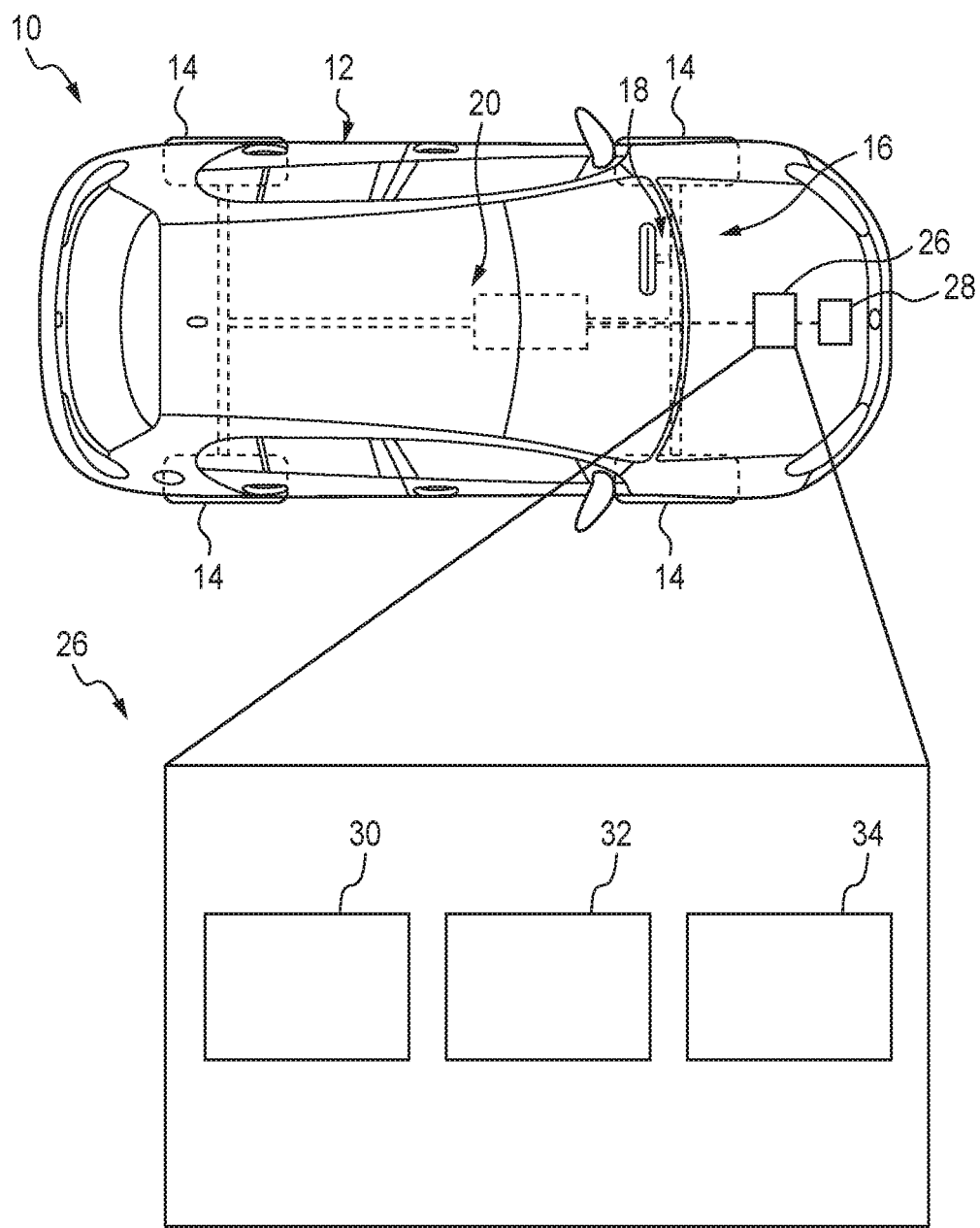
FIG. 1 is a plan view of an autonomous transportation vehicle showing that the vehicle has a chassis including wheels and showing that the vehicle includes a drive system, an image capture device, and a control system, which may implement a neural network, for autonomously governing the drive system to operate the transportation vehicle for steering and propulsion.

In the illustrative embodiment as shown in FIG. 1, a transportation vehicle 10. The transportation vehicle 10 may include a base formed to include a chassis 12 having wheels 14 for supporting a vehicle body, the chassis coupled with a drive system 16. The drive system 16 may include a steering system 18 and a drive train 20. The steering system 18 may include a steering wheel coupled to provide lateral steering adjustment, for example, to the front wheels 14. The drive train 20 may include a motor(s) and transmission system to provide motive power to the wheels 14, and may be formed with combustion, electric, and/or hybrid engines.

The transportation vehicle 10 may include a control system 26 for conducting autonomous vehicle operations. The control system 26 may be arranged in communication with the drive system 16 to provide autonomous control of the steering system 18 and/or the drive train 20. The transportation vehicle 10 may include an image capture device 28 for capturing images of transportation vehicle operation. The image capture device 28 may be formed as a forward-facing camera for capturing video and/or photo images of the path of the vehicle 10. The control system 26 may be configured to determine and execute autonomous vehicle operations based on images from the image capture device 28.

Referring still to FIG. 1, the control system 26 is shown in diagrammatic view. The control system 26 may include a processor 30 for executing instructions stored on a memory 32, and communications circuitry 34 for sending and receiving communications between the processor 30 and other systems of the transportation vehicle 10. The processor 30 may be formed as one or more processing units, such as a microprocessor. The memory 32 may be formed as one or more storage devices, including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory.

Figure 2:
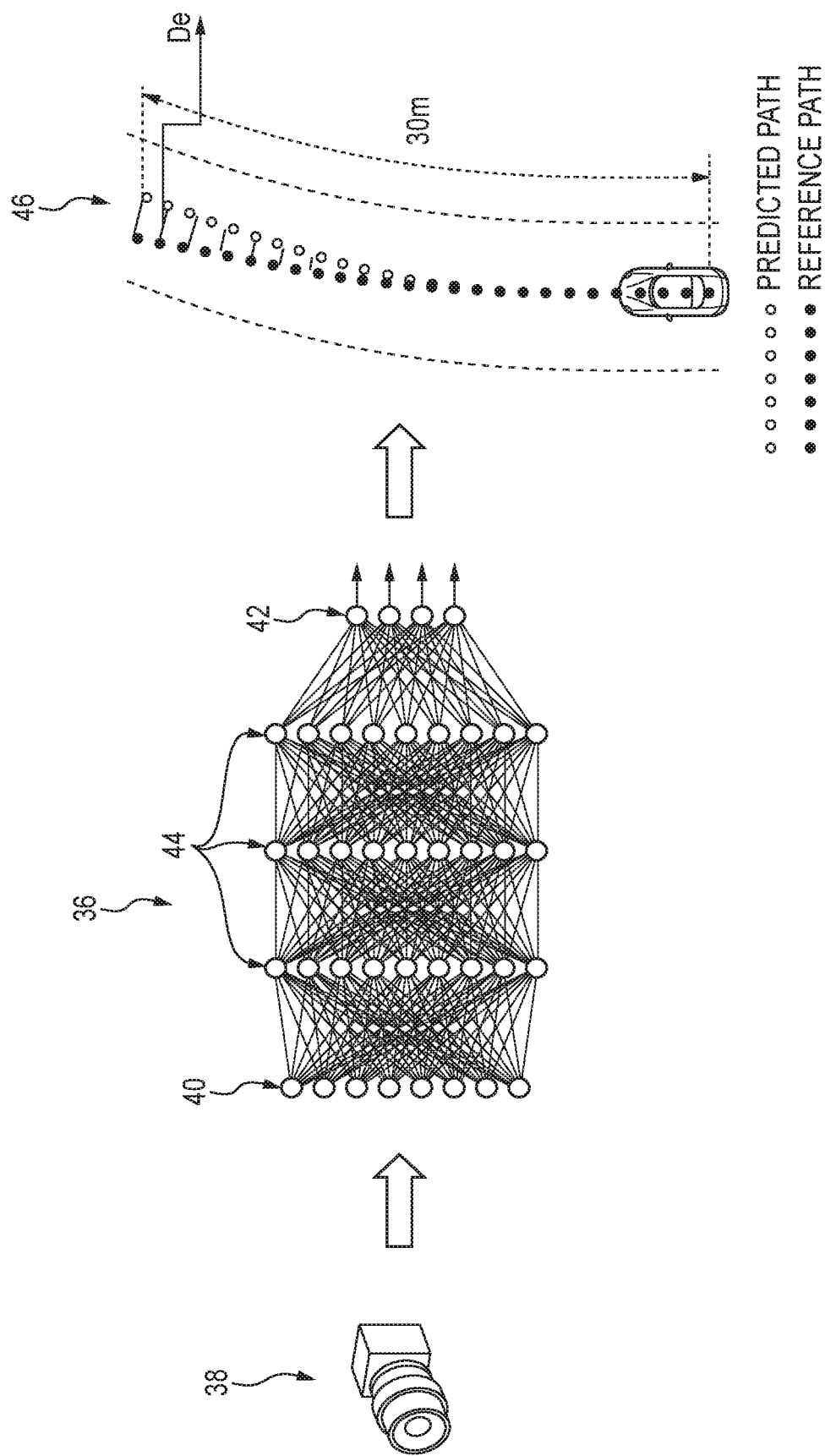
FIG. 2 is a diagrammatic view showing that the neural network of the transportation vehicle of FIG. 1 may receive images for consideration, and may output governance commands for autonomous transportation vehicle operation.

Referring to FIG. 2, a neural network 36 may be formed as one or more instructions of the memory 32 for analysis of information. The neural network 36 may be trained by inputting data to allow the development of control results based on the data. The control results may be refined until acceptable performance levels are reached. One example of acceptable performance levels may include operation of a threshold level of driving operations without exceeding barriers, for example, 2500 hours of operation without disengagement requiring human intervention. The data input for consideration by the neural network 36 may include images 38 provided as examples of images captured by the image capture device 28. The neural network 36 may include a number of layers for analyzing the input data, for example, an input layer 40 and output layer 42, and one or more connection layers 44 between the input and output layers 40, 42 for providing analysis according to the neural network configuration. The input layer 40 may receive the input data for processing through the various connection layers 44 to provide autonomous vehicle operations based on the input data. The output layer 42 may generate output information, for example, driving paths 46 for autonomous transportation vehicle operation.

Figure 3:
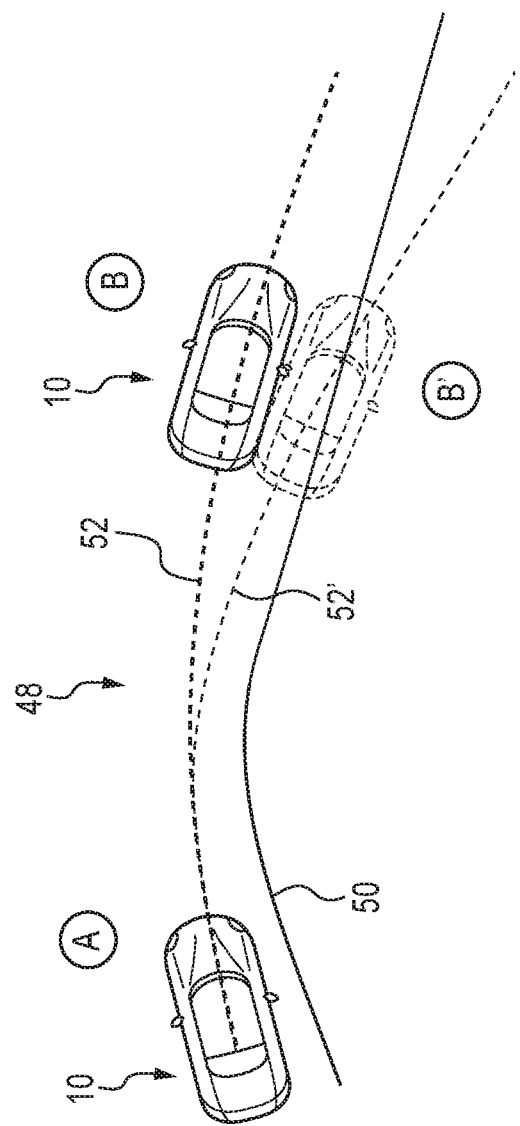
FIG. 3 is another plan view of the transportation vehicle of FIG. 1 driving on a roadway lane having an actual course of travel in solid line, and a simulated course of travel in broken line.

Referring now to FIG. 3, an example of preferred and non-preferred courses of travel are shown in the context of autonomous vehicle operation. During autonomous operation of the transportation vehicle 10 can proceed along a lane 48 of the roadway marked by lane marker 50. The vehicle may have a course of travel 52 at interval A which may be commonly understood as following the lane curvature generally in the center of the lane 48. Continuing along the course of travel 52, the vehicle 10 would arrive at interval B as shown in solid in FIG. 3, to maintain the central lane position along the curvature of the lane 48.

In training a neural network, images from exemplary driving operations may be provided as training materials. For example, images may be captured from the image capture device 28 along the course of travel 52 at intervals A and B. The image at the interval A position can be used as the reference image to teach the neural network to follow the course of travel 52 to the interval B position.

However, training the neural network merely with the images from the desirable operations, for example, central lane travel of course of travel 52, can omit other opportunities for training. For example, by merely considering the images obtained from the image capture device 28 at intervals A and/or interval B, the neural network would not have the opportunity to train in guiding the vehicle 10 to recover from a position B' in which the vehicle 10 overshot the curvature of the lane 48 to take course of travel 52'. For example, at the position B' the vehicle may be severely off-center to cross the lane marker 50 and/or may include a severe lateral pitch out-of-parallel with the lane marker 50. Yet, obtaining a real image from the position of B' could be impractical and/or unsafe, and/or may be challenging to obtain simultaneously with that of position B. As discussed in additional detail herein, modifying and/or manipulating real images can simulate a range of image information to assist in training and/or testing autonomous systems.

Figure 4A:
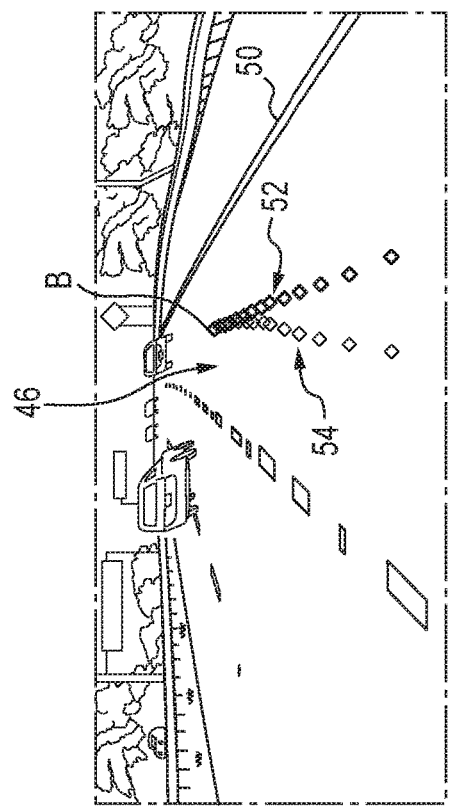
FIG. 4A is an exemplary image captured by an image capture device.

As shown in FIG. 4A, an exemplary image is shown that may be captured by the image capture device 28 with the course of travel 52 indicated for reference. The captured image of FIG. 4A may represent an image of interval A, discussed in reference to FIG. 3, and can be used to train the neural network. An indication of the position of the vehicle 10 at interval B is shown for descriptive purposes. However, with reference to FIG. 4B, an augmented image is shown for training the neural network. The augmented image can be applied in addition to or in place of the captured image in training the neural network.

Figure 4B:
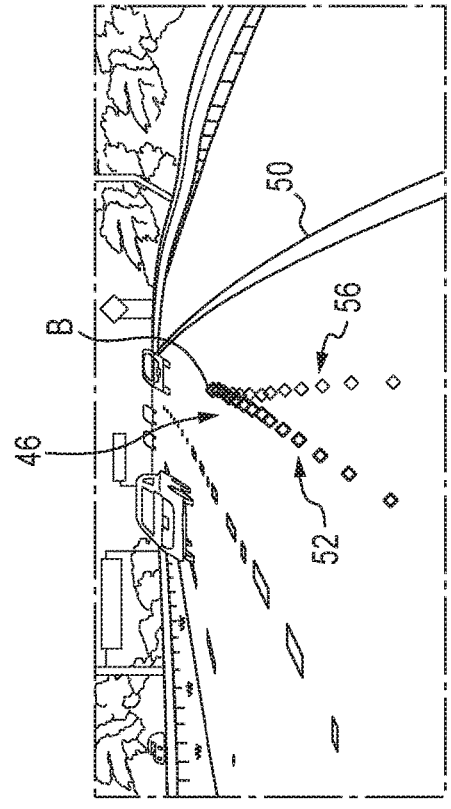
FIG. 4B is another exemplary augmented form of the image captured in FIG. 4A, showing that an artificial image shift has been performed to provide an artificial impression of the transportation vehicle being leftward of its actual position.

As seen by comparison of FIGS. 4A and 4B, the augmented image of FIG. 4B represents a lateral shift in position from that of the captured image in FIG. 4A. In the illustrative embodiment, the lateral shift augmentation in FIG. 4B from the position in FIG. 4A is embodied to be about 2.3 ft (0.7 m) leftward from the perspective of the image capture device 28, which can be understood as the actual course of travel 52 appears to be rightward of the center of the augmented image. The augmented image of FIG. 4B provides an impression of the vehicle 10 being left-of-center in the lane 46.

Using the augmented image of FIG. 4B, a remedial course of travel 54 can be determined. The remedial course of travel 54 is illustratively embodied as the course of travel for returning the vehicle 10 to the course of travel 52 at the position of interval B. The control system 26 illustratively determines the remedial course of travel 54 based on the augmented image of FIG. 4B, and may consider other information, for example but without limitation, speed, yaw, road conditions, traffic, among others. The remedial course of travel 54 is shown to include gradual change in the vehicle 10 position to re-join the course of travel 52, without undue stress to passengers, such as without undue G-force imposed on occupants.

Figure 4C:
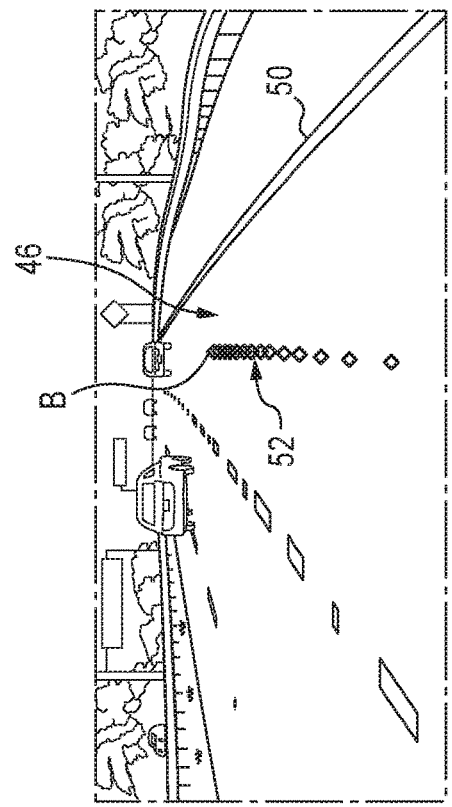
FIG. 4C is another exemplary image captured by an image capture device.
Figure 4D:
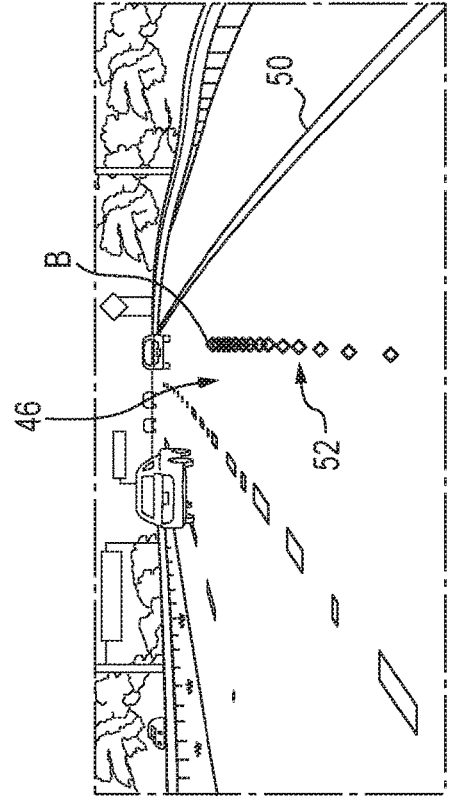
FIG. 4D is another exemplary augmented form of the image captured in FIG. 4A, showing that an artificial image shift has been performed to provide an artificial impression of the transportation vehicle being rightward of its actual position.

As seen by comparison of FIGS. 4C and 4D, another augmented image of FIG. 4D represents a lateral shift in position from that of the captured image in FIG. 4C, which is illustratively equal to the image of FIG. 4A in this instance for descriptive purposes. In the illustrative embodiment, the lateral shift augmentation in FIG. 4D from the position in FIG. 4C is embodied to be about 3 ft (0.9 m) rightward from the perspective of the image capture device 28, which can be understood as the actual course of travel 52 appears to be leftward of the center of the augmented image. The augmented image of FIG. 4D provides impression of the vehicle 10 being right-of-center in the lane 46.

Using the augmented image of FIG. 4D, a remedial course of travel 56 can be determined. The remedial course of travel 56 is illustratively embodied as the course of travel for returning the vehicle 10 to the course of travel 52 at the position of interval B. The control system 26 illustratively determines the remedial course of travel 56 based on the augmented image of FIG. 4D, and may consider other information, for example but without limitation, speed, yaw, road conditions, traffic, among others. The remedial course of travel 56 is shown to include gradual change in the vehicle 10 position to re-join the course of travel 52, without undue stress to passengers, such as without undue G-force imposed on occupants.

Figure 5A:
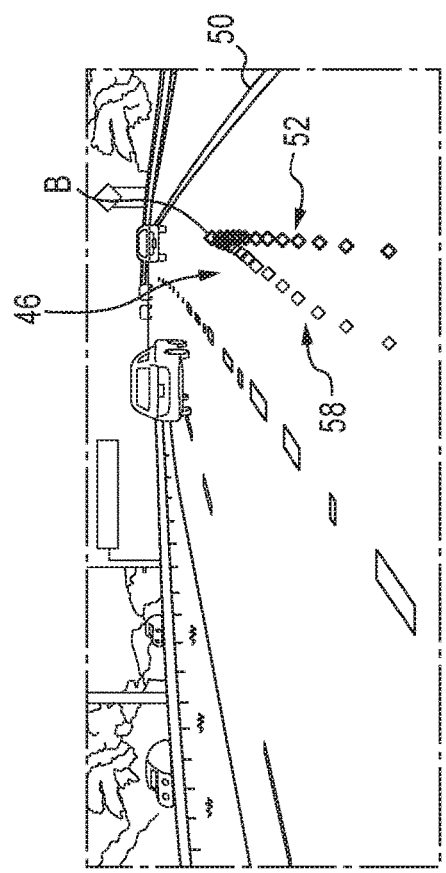
FIG. 5A is another exemplary image captured by an image capture device.

Referring now to FIGS. 5A-5D, another manner of image augmentation is shown. As shown in FIG. 5A, an exemplary image is shown that may be captured from an image capture device 28 with the course of travel 52 indicated for reference, which is illustratively equal to FIGS. 4A and 4C for descriptive purposes. The captured image of FIG. 5A, may represent an image of interval A and can be used to train the neural network. An indication of the position of the vehicle 10 at interval B is shown for descriptive purposes. However, with reference to FIG. 5B, an augmented image is shown for training the neural network. The augmented image can be applied in addition to or in place of the captured image in training the neural network.

Figure 5B:
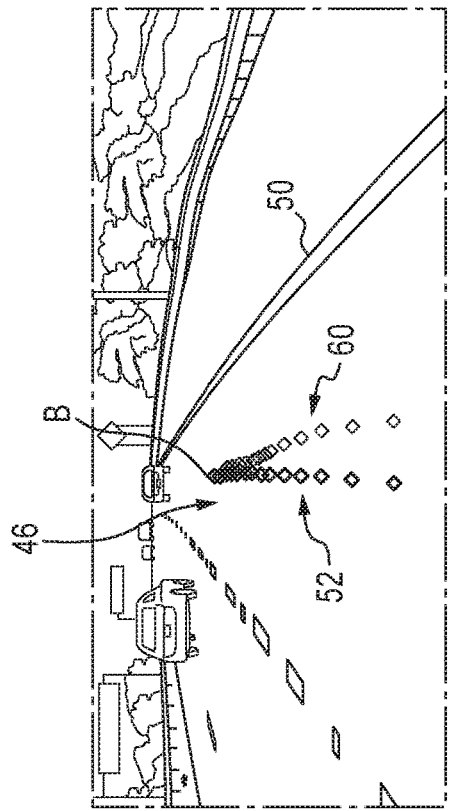
FIG. 5B is another exemplary augmented form of the image captured in FIG. 5A, showing that an artificial image rotation has been performed to provide an artificial impression of the transportation vehicle having leftward yaw from its actual position.

As seen by comparison of FIGS. 5A and 5B, the augmented image of FIG. 5B represents a shift in yaw angle position from that of the captured image in FIG. 5A. In the illustrative embodiment, the yaw angle augmentation in FIG. 5B from the position in FIG. 5A is embodied to be about 9 degrees leftward from the perspective of the image capture device 28. The augmented image of FIG. 5B provides an impression of the vehicle 10 being out-of-parallel with the lane marker 50 of the lane 46.

Using the augmented image of FIG. 5B, a remedial course of travel 58 can be determined. The remedial course of travel 58 is illustratively embodied as the course of travel for returning the vehicle 10 to the course of travel 52. The control system 26 illustratively determines the remedial course of travel 58 based on the augmented image of FIG. 5B, and may consider other information, for example but without limitation, speed, yaw, road conditions, traffic, among others. The remedial course of travel 58 is shown to include gradual change in the vehicle 10 position to re-join the course of travel 52, without undue stress to occupants, such as without excessive G-force imposed on occupants.

Figure 5C:
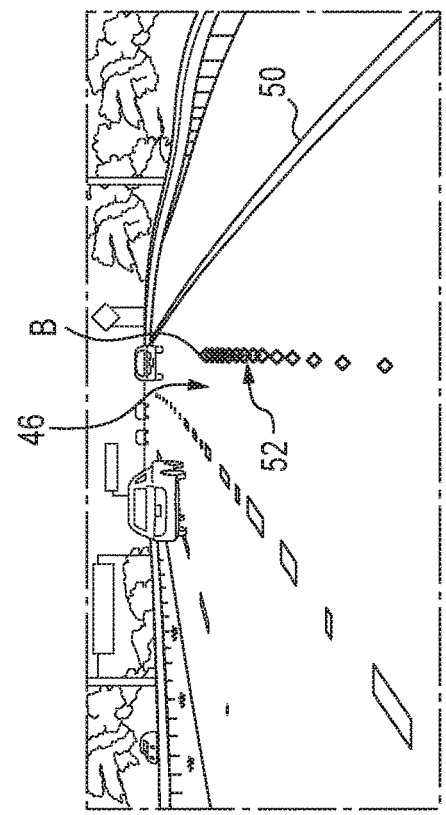
FIG. 5C is another exemplary image captured by an image capture device.
Figure 5D:
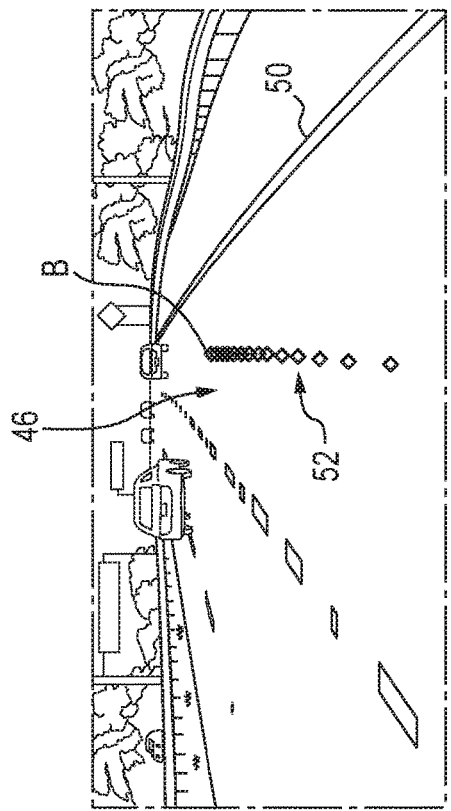
FIG. 5D is another exemplary augmented form of the image captured in FIG. 5C, showing that an artificial image shift has been performed to provide an artificial impression of the transportation vehicle being rightward yaw from its actual position.

As seen by comparison of FIGS. 5C and 5D, the augmented image of FIG. 5D represents a shift in yaw angle position from that of the captured image in FIG. 5C, which is illustratively equal to FIG. 5A for descriptive purposes. In the illustrative embodiment, the yaw angle augmentation in FIG. 5D from the position in FIG. 5C is embodied to be about 6 degrees rightward from the perspective of the image capture device 28. The augmented image of FIG. 5D provides an impression of the vehicle 10 being out-of-parallel with the lane marker 50 of the lane 46.

Using the augmented image of FIG. 5D, a remedial course of travel 60 can be determined. The remedial course of travel 60 is illustratively embodied as the course of travel which for returning the vehicle 10 to the course of travel 52. The control system 26 illustratively determines the remedial course of travel 60 based on the augmented image of FIG. 5D, and may consider other information, for example but without limitation, speed, yaw, road conditions, traffic, among others. The remedial course of travel 60 is shown to include gradual change in the vehicle 10 position to re-join the course of travel 52, without undue stress to occupants, such as without excessive g-force imposed on occupants.

The additional images formed as augmentations of the actual images of FIGS. 4A, 4C, 5A, and 5C can thus increase the available scenarios treated by the control system for each image actually captured. One or more augmented images can be used by the neural network to provide a more expansive training for the control system 26, and optionally the original image may also be applied. Of course, the exemplary augmentations do not impose limitations on the possible manner of augmenting images, and such augmentation may include augmentations may include augmenting pitch, roll, lateral position, height position, and/or other aspects of the image. In some embodiments, augmentations may be applied to non-original images, for example, augmented images may receive additional augmentation to further expand the possible scenarios for training. Although only a single degree of augmentation has been illustrated in the examples, multiple aspects of augmentation may be applied, for example, lateral shift and yaw shift, in a single instance.

Figure 6:
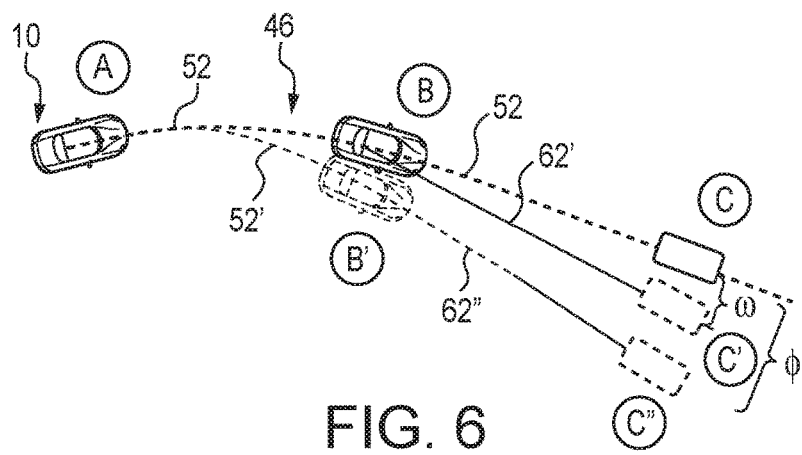
FIG. 6 is another plan view of the transportation vehicle of FIG. 1 driving on a roadway lane having an actual course of travel in solid line, and simulated courses of travel in broken line.

Referring now to FIG. 6, another aspect of the present disclosure is discussed regarding the amount of variance that may be acceptable during driving operations in consideration of the intervals A, B, and C along the actual course of travel 52 of the vehicle 10. The actual course of travel 52 proceeds along intervals A, B, C, which is embodied as the actual course which a human driver is conducting, while the control system 26 of the vehicle 10 conducts a shadow mode of operation, embodied as a simulated operation in which the control system 26 determines how it would respond in driving the vehicle 10 if the control system 26 were governing the vehicle 10.

In FIG. 6, the human driver operates the vehicle 10 from interval A to interval B along the course of travel 52. While the human driver operates the vehicle 10, the control system 26 conducts shadow mode operations to simulate if it were governing operation. The shadow mode course of travel is shown as 52' which illustratively achieves a different position at interval B', that is rightward of the actual course of travel 52. In the example, the position of the vehicle 10 at interval B' is different from the position at B, however, the position of the vehicle 10 at interval B' is still within the acceptable operation of the vehicle 10, in the present embodiment.

The acceptable amount of variance permitted can be understood where even human drivers may not take the exactly same course of travel, even within the same lane of travel and/or under the same conditions. Thus, for example, in autonomous operation, it may be acceptable for the vehicle 10 to operate within about +/−2 inches (5 cm) from the center of the lane 46. Other thresholds may apply, and/or may be determined on the basis of other conditions, for example but without limitation, speed, weather, traffic, position, angle, vehicle type, vehicle loading, among others.

Traditional shadow mode operation of a vehicle 10 may record the occurrence of the control system 26 achieving the position at interval B' for later assessment, and may continue its shadow mode operation. Upon later evaluation of shadow mode operations, a system may be authorized for autonomous operation, for example, upon achieving threshold success values. However, traditional shadow mode operation may proceed in its operation from internal B without particular consideration of the shadow mode position of B'.

This may be the case where shadow mode operations are conducted only in piecemeal from the actual images captured at intervals A, B, and C. For example, when the shadow mode generates an action to achieve the position at interval B', traditional shadow mode may then consider the actual image captured at the actual position of interval B. The shadow mode operation may determine a shadow mode course of travel 62' from the position at interval B to achieve a position at interval C' having deviation w between the position of the vehicle 10 at interval C and interval C'. However, if the shadow mode course of travel had continued from its shadow mode position at interval B' the vehicle 10 would have instead taken course of travel 62" and arrived at shadow mode course of travel C", rather than C'. Notably, the deviation w between the position of the vehicle 10 at interval C and interval C' is smaller than the deviation 4 between the position of the vehicle 10 at interval C and interval C". In instances where the deviation ϕ is outside of the tolerable limits for autonomous operation but deviation w is within tolerable limits, a disengagement requiring human intervention may not be triggered in considering only the shadow mode course of travel 62'. Although the deviations j, w are illustrated to be lateral position deviations, deviations may include any manner of changes in course including but without limitation lateral position, angle, speed, acceleration, among others.

Figure 7:
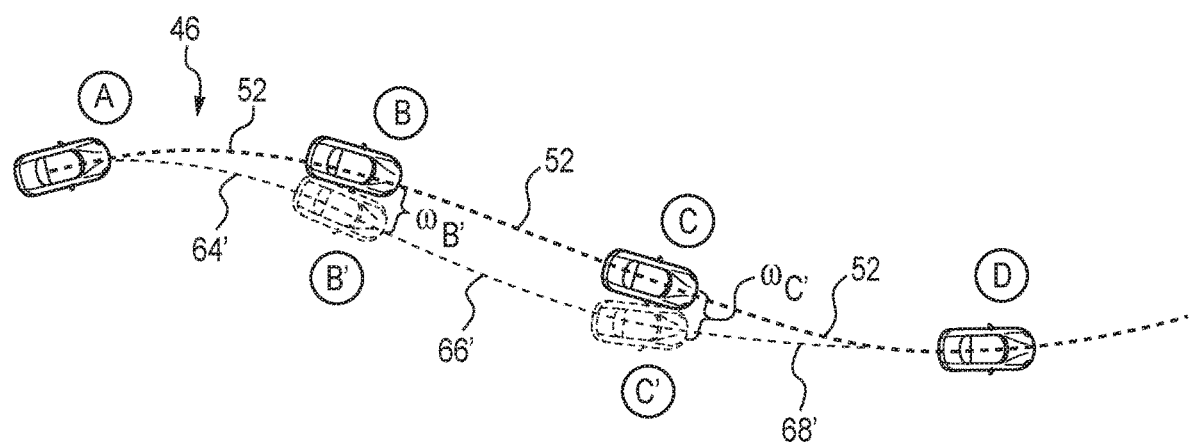
FIG. 7 is another plan view of the transportation vehicle of FIG. 1 driving on a roadway lane having an actual course of travel in solid line, and a simulated course of travel in broken line.

However, obstacles in conducting shadow mode operations can be overcome. In referring to FIG. 7, augmenting images can allow a shadow mode course of travel to re-join the actual course of travel 52. For example, an image captured at interval A may be interpreted by the control system 26 to provide shadow mode course of travel 64' achieving the position at interval B' which forms a deviation $\omega_{B'}$ relative to the actual course of travel 52. Yet, instead of merely continuing shadow mode operation based on the image captured at interval B, the image captured at interval B can be augmented to create impression of the position of the vehicle 10 at interval B'.

The control system 26 can receive the actual image captured at B and determine the deviation $\omega_{B'}$. The control system 26 can augment the actual image captured at B to provide impression of the position of the vehicle 10 at interval B'. The control system 26 can then determine the shadow mode course of travel 66' based on the augmented image captured at interval B. By augmenting the actual image of vehicle 10 at interval B to have the impression of the position at interval B', the control system 26 can be permitted to manage the deviation $\omega_{B'}$ rather than be forced to merely assess the conditions of the actual position at interval B.

In the illustrative embodiment, the actual course of travel 62 continues to the position at interval C. Meanwhile the shadow mode course of travel 66' achieves the position at interval C' which forms a deviation of $\omega_{C'}$ relative to the course of travel 52. The image captured at interval C can be augmented to create impression of the position of the vehicle 10 at interval C'.

The control system 26 can receive the actual image captured at C and determine the deviation $\omega_{C'}$. The control system 26 can augment the actual image captured at C to provide impression of the position of the vehicle 10 at interval C'. The control system 26 can then determine the shadow mode course of travel 68' based on the augmented image captured at interval C. By augmenting the actual image of vehicle 10 at interval C to have the impression of the position at C', the control system 26 can be permitted to manage the deviation $\omega_{C'}$ rather than be forced to merely assess the conditions of the actual position at interval B.

In the illustrative embodiment, the actual course of travel continues to the position at interval D. Meanwhile, the shadow mode course of travel 68' achieves the position at interval D thus re-joining the actual course of travel 52. Of course, if the shadow mode course of travel 68' did not achieve the position of the vehicle 10 at interval D, image augmentation could be continued by augmenting the image captured at interval D accordingly. Similarly, had the shadow mode operations rejoined the actual course of travel 62 before interval D, for example at interval C, further image augmentation may not be required.

Figure 8:
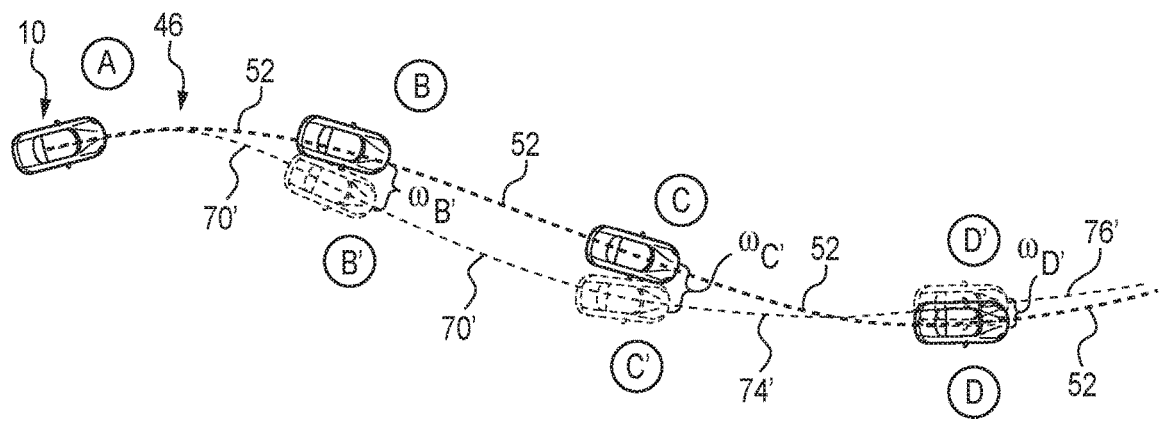
FIG. 8 is another plan view of the transportation vehicle of FIG. 1 driving on a roadway lane having an actual course of travel in solid line, and a simulated course of travel in broken line.

Referring to FIG. 8, the actual course of travel 52 illustrates the guidance of a human driver along the lane 46 over intervals A, B, C, D. The shadow mode operation determines shadow mode course of travel having segments 70', 72', and 74' each formed by determination by the control system 26 based on the actual image captured at interval A, and the augmented images of the position of the vehicle 10 at intervals B and C, to have the impression of the position having the deviation $\omega_{B'}$, $\omega_{C'}$, accordingly. However, even the shadow mode course of travel 74' does not fully rejoin the actual course of travel 52 and instead overshoots the actual position at interval D and creates deviation $\omega_{D'}$. The image captured at interval D may be augmented to have the impression of position D' and the shadow mode course of travel may continue as 76' to continue to attempt rejoining the actual course of travel 52.

Yet, in FIG. 8, during each of the intervals A, B, C, D the shadow mode does not exceed thresholds of acceptable autonomous operation. For example, the deviations $\omega_B$, $\omega_C$, $\omega_D$, may all be within threshold deviations levels, such as +/−2 inches (5 cm) from the actual course of travel 52, although threshold acceptable parameters may include adjustable thresholds based on operational conditions (e.g., speed, weather, traffic, etc.), and/or are not limited to the examples mentioned herein, such as lateral positions. Accordingly, the shadow mode operations have achieved relative success during the periods between interval A and D (or D'), such that no disengagements occurred in which human intervention should be instituted over autonomous operations.

Figure 9:
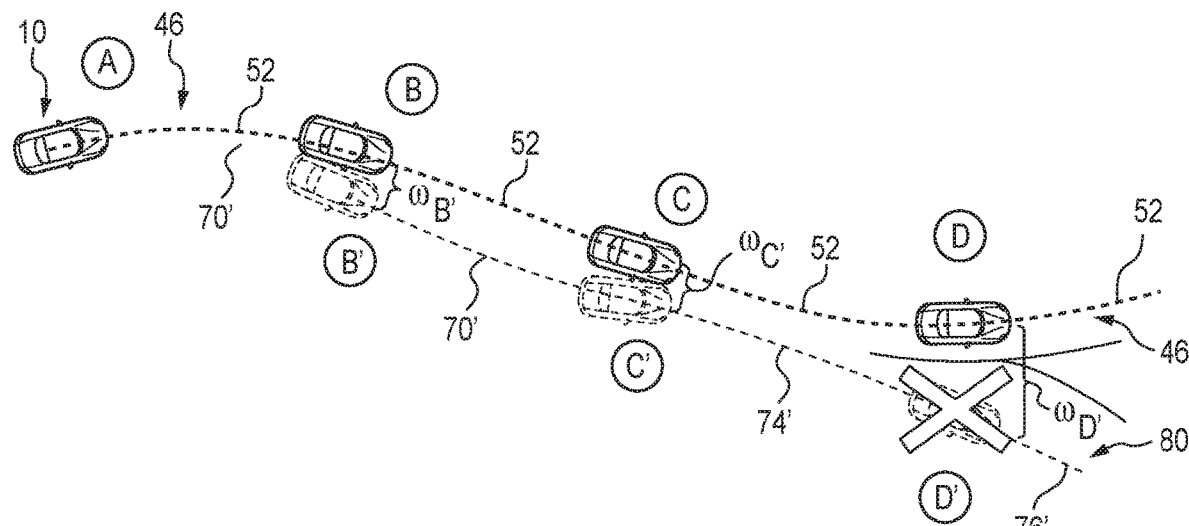
FIG. 9 is another plan view of the transportation vehicle of FIG. 1 driving on a roadway lane having an actual course of travel in solid line, and a simulated course of travel in broken line which results in a disengagement which would require human intervention.

Referring now to FIG. 9, a similar operational scenario is shown from FIG. 8 yet the final shadow mode course of travel 74' achieving position D' has a deviation of $\omega_{D'}$ which exceeds thresholds for acceptable autonomous operation and is deemed to be a disengagement requiring human intervention. In the illustrative embodiment, the disengagement has occurred by otherwise safe autonomous operation, but the shadow mode operations elected to take a shadow mode course of travel 74' to follow an off-ramp 80 instead of continuing in the lane 46 as taken by the actual human driver.

Accordingly, the course of shadow mode operations can be drawn out to a greater degree of realistic operation by applying the image augmentations as disclosed herein to avoid strict adherence to the actual images captured. Moreover, a distinction can be drawn in shadow mode operations between disengagement and those operations which do not result in disengagement. For example, data concerning shadow mode operations which result in disengagements may be of greater concern than those not resulting in disengagements. Accordingly, data from disengagements can be stored for later analysis, while data concerning shadow mode operations which do not result in disengagements may be discarded and/or maintained at lower levels (e.g., lower quality, frequency, and/or resolution, etc.), which can reduce the amount of data storage for performing and/or assessing shadow mode operations.

Figure 10:
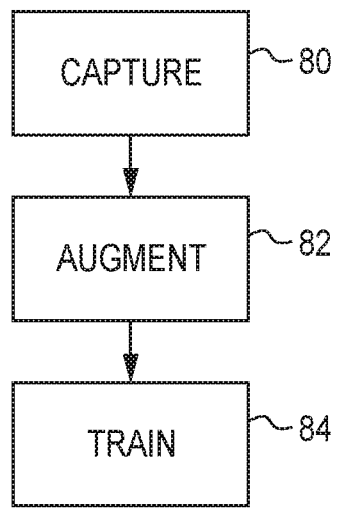
FIG. 10 is process flow diagram indicating an operation of image augmentation for autonomous transportation vehicles.

Referring now to FIG. 10, a process flow diagram illustrates the operation of training of autonomous vehicle operation. In box 80, image capture is performed. Image capture may include capturing actual images from vehicle operation, but in some embodiments, may include selecting one or more images from pre-determined image banks for training the neural network of an autonomous vehicle control system. Once one or more suitable images have been captured, image augmentation can be performed as suggested in box 82.

Image augmentation may include performing one or more adjustments to one or more of the captured images to provide an artificial impression of a driving position of the vehicle. In box 84, training may be performed based on at least one of the augmented images. For example, training may include training of the neural network based on or more of the augmented images. The operation of image augmentation for training autonomous vehicle operation may be repeated, and/or may include multiple iterations of the process occurring in parallel. Accordingly, an autonomous vehicle operating system can be trained to accommodate a broad spectrum of visual information with improved ease, success, and/or reduced infrastructure needs.

Figure 11:
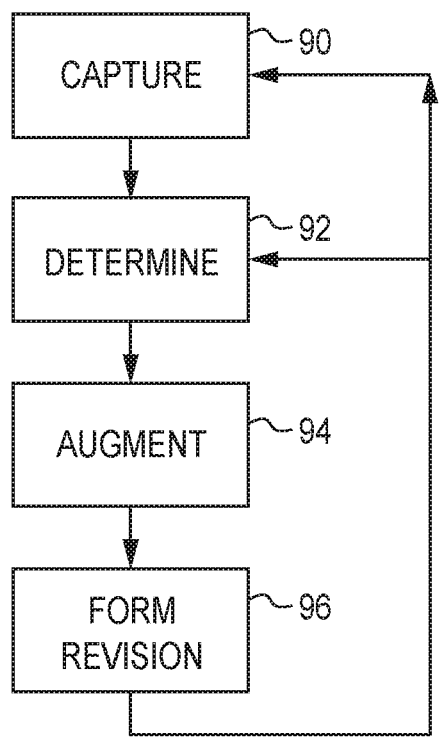
FIG. 11 is another process flow diagram indicating an operation of image augmentation for autonomous transportation vehicles.

Referring now to FIG. 11, a process flow diagram illustrates the operation of shadow mode operation of autonomous vehicle systems. In box 90, image capture is performed. Image capture may include capturing one or more actual images from vehicle operation, but in some embodiments, may include selecting one or more images from pre-determined image banks for training the neural network of an autonomous vehicle control system. Image capture may be performed by and/or at the command of the processor 30, for example, by the image capture device 28.

Once one or more suitable images have been captured, image augmentation can be determined as suggested in box 92. Image augmentation may be determined as the deviation between an actual course of travel of the vehicle in comparison with a shadow mode course of travel. In some embodiments, the image augmentation may be determined based on one or more predicted courses of travel, for example but without limitation a known or predicted course for the actual vehicle travel in comparison with the known or predicted shadow mode courses of travel. Determination of image augmentation may be performed by and/or at the command of the processor 30.

In box 94, image augmentation can be performed to form one or more augmented images. Image augmentation may include one or more augmentations to one or more images. Images to be augmented may include images captured in box 90, and may be augmented according to the determination of image augmentation of box 92. Image augmentation may be performed by and/or at the command of the processor 30.

In box 96, a revision to the autonomous vehicle control system 26 may be formed. For example, one or more revisions to the instructions stored on the memory 32 for execution by the processor 30 for autonomous vehicle guidance may be formed. The revisions may be based on the augmented images of box 94. For example, the revisions may be formed based on the remedial courses of travel that result in disengagements which occur as a result of the shadow mode operations failing to maintain operation within thresholds for acceptable operation. In some embodiments, remedial courses of travel which do not result in disengagements may be considered in forming the one or more revisions. The operations of image capture of box 90 and/or the image augmentation determination may be returned to in order to further develop shadow mode operations.

Accordingly, shadow mode operations can be refined themselves and/or assist in refining autonomous operations to consider more expansive information than available merely within actual imaging. Implementing revisions to instructions, such as the neural networks of autonomous vehicle control systems, can provide speed to accurate and/or precise operations, cost-reduction in back-end analysis, and/or improved autonomous efficiency. Moreover, the devices, systems, and/or methods within the present disclosure can avoid the need for multiple cameras in order to provide expansive image configurations for training and/or developing autonomous systems. Reduction or hardware and/or software can likewise reduce the cost of implementing autonomous techniques.

Autonomous vehicle software stack(s) may follow a modular architecture. The modules may include sensor fusion, semantic segmentation (scene understanding), dynamic object state prediction, path/trajectory planning, and control. Each of these modules could be embodied as a machine learning-based system or a rule-based system, where the scene understanding module(s) are often machine learning based systems. To train such machine learning systems, presumably a neural network (NN), a large amount of labeled training data is generally required as input. For example, such training data may include hundreds of thousands of images where each pixel is labeled as belonging to a tree, a pedestrian, a lane marking, a building, a car, a road sign, etc., and such labelling may be performed largely manually (perhaps with some software assistance). It can be very costly and/or time consuming to produce such training data, and this may represent just one of the modules in the autonomous vehicle software stack that can require machine learning.

However, control modules are well-understood and/or mature module that can be a rule-based systems. Some parameter tuning may still be required when transferring the module from one type of vehicle to another, but the process can be a less time-consuming one. Within the present disclosure is an end-to-end machine learning solution for obtaining the proper vehicle path. This solution can replace other modules before the control module, and/or can achieve path prediction from sensory data with one neural network. Solution within the present disclosure may reduce and/or eliminate the need for arduous data labeling tasks that the module approaches can require, because the vehicle path may be the only training labels needed, which could be obtained by a simple physics model given the vehicle's speed and acceleration in the 2D plane, for example. Moreover, devices, systems, and methods within the present disclosure may only read one sensor: a front-facing camera. The lack of expensive Light Detection and Ranging (LiDAR) arrangements can provide competitive advantage.

Another technical problem may include a data diversity problem. Traditional methods of collecting data for training a machine learning system for self-driving functions can include recording sensory data and other vehicle signals when test drivers are hired to drive around in desired domains for extended periods of time. In one exemplary case, images can be collected, and the corresponding labels can be calculated from CAN bus data using a physics model. An important feature that a self-driving system may have is to know how to recover from undesirable situations, such as dangerous situations. For example, if for whatever reason, a car in autonomous mode steers the car off to the edge of the vehicle lane, then the lane keeping function should know to react quickly to steer the car back to the lane center.

However, during normal data collection with test drivers, it may be relatively rare or unlikely to ever get this type of dangerous scenarios in the images used to train the autonomous systems, and thus, the corresponding records of any recovery maneuvers that an experienced test driver would perform can be challenging to obtain. Thus, a neural network trained with just the raw collected data would not ordinarily learn from this type of important data and/or would not directly learn to deal with this type of abnormal scenario. The present disclosure includes image augmentation techniques that can assist in address this problem. Images may be transformed with these techniques so that they look as if they were taken when the car was in different positions and angles with respect to the road, so as to simulate abnormal and dangerous scenarios.

The present disclosure includes devices, systems, and methods for applying a neural network to map an image to a vehicle path. The steering portion of operation may be left to the on-board controller in some embodiments. Traditional methods may use 2 or more (3) cameras to generate image shifts. Yet, image augmentation using only one camera can provide improved training for the neural network. Other approaches may overlook issues of labeling in the transformed images for training, and/or the suitability of definition of the mathematical problem, for example, as vehicle speed could influence the amount of adjustment in reference points such as steering wheel angle, and associated commands given by related types of image transformation. Solutions within the present disclosure, including path predicting, may provide well-defined problems for issue such as label transformation given the image augmentation techniques.

Within the present disclosure, during training, neural networks can be presented with many front camera images and the corresponding driving path that a human driver actually took, for example, within the next 30 meters after encountering that image. The neural network can be trained to reproduce this driving path that the human driver actually took. In other words, the neural network can be taught to minimize the deviation between its prediction and what the driver did. In the present instance, the deviation may be expressed as the average distance between the 20 pairs of points that make up the two 30-meter paths. Once the neural network is trained, it may be capable of take the lead in controlling the vehicle. The neural network may interpret an image taken by the front-facing camera 10-30 times a second, and may produce a path for each image. The path can be passed onto the on-board control module, which would translate the path into steering adjustments, such as appropriate wheel angles.

Data diversity can be of concern for this problem, especially when it comes to dangerous scenarios and their corresponding recovery maneuvers. Data augmentation techniques can be aimed at mitigating this concern, for example, image augmentation techniques. Image augmentation can be used in training perception neural networks to increase the diversity of input data. The present disclosure includes lateral shift and rotational shift of images to transform the images so that the images look as if it were taken when the car was in different positions or angles in the world coordinate. The lateral shift technique may include the original image being transformed to look as if the car were on the left side and/or right side of the lane. The corresponding vehicle path can be transformed as well, so that the new path would appear to start at the new vehicle position, and would gradually move the vehicle back to its original path. The present disclosure includes rotational shift, for example, yaw shift. The rotational shift technique may include the original image being transformed to look as if the car's longitudinal axis were making a different angle (yaw angle) with the lane. The corresponding vehicle path may be transformed as well, so that the new path would appear to start out headed in the direction of vehicle's longitudinal axis in the transformed image, and would gradually move the vehicle back to its original path. The present disclosure includes application of one or both shift techniques together (lateral and rotational shift). During training, a fraction of the training data, selected at random, may be transformed with various magnitudes of lateral shift and rotational shift. Training error may be reduced significantly with the implementation of these augmentation techniques.

Path predicting arrangements and/or methods within the present disclosure may provide more robust handling of speed variations, more robust handling of dropped (lost) camera frames (e.g., a 30-meter path is may apply for a whole second on the highway); more intuitive visualization for safety monitoring and troubleshooting. Techniques within the present disclosure may apply a highway lane keeping function requiring just one camera as sensor, requiring relatively little computing power, for example, available by a system-on-a-chip (SOC) such as a raspberry-pi.

Within the present disclosure, disengagement (e.g., needed driver take-over), can be a common way to define failure cases for autonomous and/or semi-autonomous functions in vehicles. For user experience and/or safety reasons, it may be desirable to reduce the potential number of disengagements before the functions are used by the vehicle occupants. Such functions can be tested using test drivers during series production phase and improve the functions iteratively there, but it can be difficult and/or time consuming to cover the vast diversity of driving scenarios that occupant can face using just one or more teams of test drivers.

Traditional methods can include testing autonomous functions using a "shadow mode" within the consumer fleet, in which, consumers are responsible for driving the cars, and the autonomous function algorithms are running and/or reading sensory input in the background, but the autonomous functions themselves are not engaged (e.g., the autonomous functions are not driving the vehicle, rather the human driver is driving the vehicle). In this "shadow mode" scheme, the drivers' actions may be assumed to be the safe references that the autonomous functions should replicate. If the autonomous function output running in shadow mode and the drivers' actions are the same and/or very similar to each other, it can be determined that the autonomous functions are functioning properly. However, if the autonomous functions are producing (in shadow mode simulation) somewhat different actions than what the driver actually does, then it may be important to collect data from these deviant cases in order to assess and remediate issues, if required. Such deviant cases may be termed "corner cases," and can require triage and/or improvement to the underlying functions with the data collected from these corner cases. Accordingly, by detecting and considering these corner cases, other cases may be disregarded, such that vast diversity of possible scenarios faced by a customer fleet can be considered while reducing the amount of data being collected.

However, there may exist corner cases in which the autonomous functions running in shadow mode disagree with the customer's action but do not necessarily lead to disengagement. For example, in a wide road, a customer and the algorithm can drive in somewhat divergent paths but both produce valid paths. Yet, even if the autonomous functions only differs from the driver's action by a small amount each time (which does not trigger a corner case), these small deviations may add up over time to cause a disengagement because traditional manners of considering corner cases for autonomous functions may be measured in segments, concerning only one time step (or length of travel) at a time. For example, at one time step, a neural network running in the background may read an image from the front-facing camera, and may output a driving path for the next 30 meters. This output path may be compared with the driver's actual path taken during the next 30 meters. If the shadow mode path and the actual path deviate only slightly, e.g., the neural network leads the car 3 centimeters to the left of the actual human driver path at the end of the 30 meter path, then it can be deemed to be below a tolerance threshold and should not be considered a corner case. This is understandable because even two humans driving the same 30-meter path can deviate from each other by small amounts, e.g., a tens of centimeters.

Continuing the example, during the next time step, the neural network may read another image from the camera, and may produce another path that would lead the car 3 centimeters to the left of the driver's actual path. This neural network could have an inherent left bias for a particular scenery, but would eventually lead the car out of the lane if it were responsible for driving the car as the stack up in 3 centimeter left guidance would compound over time. However, the stack up misguidance of this scenario may go unidentified by disengagement with the aforementioned way of testing, because each time step, the reference images for each step interval that are fed into the neural network are taken when the human was driving the car. Thus, the images do not consider the actual results from the previous operation of the shadow mode function of the neural network. Even though the neural network's output would lead the car slightly to the left at each time step, that deviation does not propagate to the next time step, as the next image may be taken after the human driver's presumably correct actions are taken. In that regard, isolated snap shots of mistakes that the autonomous functions may make in this canonical shadow mode testing, but such approaches may fail to identify temporal dynamic scenarios where more subtle and/or complex errors accumulate to trigger an disengagement. Devices, systems, and methods within the present disclosure can seek to manage these more complex cases. Along multiple cameras may be applied in the arrangements of the present disclosure, a signal forward facing camera may present an efficient configuration to apply the disclosed techniques. The present disclosure includes running real-time simulation with images collected on-board so as to test neural network performance in simulation.

Traditional approach applying re-simulators may assume that the simulation is performed on a computer, after all data has been collected for a trip. Applied this way, the re-simulator may evaluate the performance of the neural network, but the simulator may require collection of significant amounts of data while driving in order to conduct the re-simulation offline. The resimulator may not help in identifying corner cases while driving, and may not allow reduction of the data storage needed for retraining neural networks. Yet, arrangements within the present disclosure may allow running re-simulator in shadow mode to identify potential disengagements in real-time, and may allow collection of only those corner cases for further evaluation offline. Other artificial simulators may fail to train and/or test neural networks using photorealistic data which would be encountered in the real world. Devices, systems, and methods within the present disclosure may include one more neural networks, computer vision (for data augmentation), and/or in-vehicle computing (for real-time positional shift calculation and ring buffer utilization).

Although embodiments disclosed herein may indicated still images, video images are equally applicable and may be augmented in the same or similar manner as disclosed relative to the embodiments herein. The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. An autonomous transportation vehicle, comprising:
   a vehicle base including a chassis and a drive system, the drive system comprising a steering system for providing lateral steering adjustment of the vehicle base and a drive train coupled with the chassis to provide propulsion of the vehicle base;
   an image capture device coupled with the vehicle base to capture images during operation of the autonomous transportation vehicle; and
   means for conducting shadow mode autonomous guidance of the drive system including generating simulated autonomous guidance of the drive system while a human driver conducts actual guidance of the drive system, for determining shadow mode autonomous guidance operations, for receiving one or more captured images from the image capture device indicating an actual course of travel of the autonomous transportation vehicle, for augmenting at least one of the one or more captured images to impose an artificial perception of a shadow mode course of travel corresponding to actualization of the shadow mode autonomous guidance of the drive system, for determining a remedial course of travel for returning to the actual course of travel from the shadow mode course of travel, and for determining at least one revision to instructions based on the remedial course of travel to train the means according to the artificial perception, wherein the augmenting of at least one of the captured images includes augmenting at least one of the captured images by at least one of lateral shift and yaw shift to impose the artificial perception of the shadow mode course of travel for consideration in conducting shadow mode guidance of the drive system.

2. The autonomous transportation vehicle of claim 1, wherein the means includes a control system including at least one processor for executing the instructions stored on a memory for providing functionality of the means.

3. The autonomous transportation vehicle of claim 1, wherein the augmenting of the at least one captured image includes estimating image augmentation corresponding to actualization of the shadow mode autonomous guidance of the drive system from the perspective of the image capture device according to the at least one captured image.

4. The autonomous transportation vehicle of claim 3, wherein the augmenting of the at least one capture image includes generating augmented image data based on the estimated image augmentation.

5. The autonomous transportation vehicle of claim 1, wherein the instructions form at least a portion of a neural network.

6. The autonomous transportation vehicle of claim 1, wherein the remedial course of travel for returning to the actual course of travel from the shadow mode course of travel includes operation of the drive system to return to the actual course of travel while imposing no more than a threshold amount of g-force to occupants.

7. The autonomous transportation vehicle of claim 1, wherein the means is configured to determine an amount of deviation between the shadow mode course of travel corresponding to actualization of the shadow mode autonomous guidance of the drive system and the actual course of travel conducted by the human driver.

8. The autonomous transportation vehicle of claim 7, wherein the means is configured to determine the amount of deviation based on comparison between each of the captured images and the corresponding augmented captured image, and to determine whether the amount of deviation exceeds a threshold deviation.

9. The autonomous transportation vehicle of claim 8, wherein the means is configured to record each exceedance of the threshold deviation as a disengagement.

10. The autonomous transportation vehicle of claim 9, wherein the means is configured to store at least one of the captured image and the augmented image corresponding to each disengagement.

11. The autonomous transportation vehicle of claim 10, wherein the means is configured to exclude from storage images which do not correspond to disengagement.

12. The autonomous transportation vehicle of claim 8, wherein the threshold deviation is a deviation of 2 inches between the shadow mode course of travel and the actual course of travel.

13. The autonomous transportation vehicle of claim 1, wherein the image capture device includes a video capture device and the one or more images include video frames.

14. The autonomous transportation vehicle of claim 1, wherein the one or more captured images includes a first captured image corresponding to a first time and a second captured image corresponding to a second time, and configuration to augment at least one of the one or more captured images includes augmenting the first captured image to impose an artificial perception of the shadow mode course of travel corresponding to actualization of the shadow mode autonomous guidance of the drive system at the second time.

15. The autonomous transportation vehicle of claim 14, wherein configuration to augment at least one of the one or more captured images includes augmenting the second captured image to impose another artificial perception of the shadow mode course of travel corresponding to actualization of the shadow mode autonomous guidance of the drive system at a third time.

16. The autonomous transportation vehicle of claim 14, wherein the remedial course of travel includes a course of travel for returning to the actual course of travel from the artificial perception of the shadow mode course of travel corresponding to actualization of the shadow mode course of guidance of the drive system at the second time.

17. A method of operating an autonomous transportation vehicle, the method comprising:
   operating a control system to conduct shadow mode autonomous guidance of the autonomous transportation vehicle as a simulated autonomous guidance of the autonomous transportation vehicle while a human driver conducts actual guidance of the autonomous transportation vehicle;

capturing one or more images during actual guidance of the autonomous transportation vehicle indicating an actual course of travel of the autonomous transportation vehicle;

augmenting at least one of the captured images to impose an artificial perception of a shadow mode course of travel of the autonomous transportation vehicle corresponding to actualization of the shadow mode autonomous guidance of the autonomous transportation vehicle, wherein augmenting at least one of the captured images includes augmenting at least one of the captured images by at least one of lateral shift and yaw shift to impose the artificial perception of the shadow mode course of travel for consideration in conducting shadow mode guidance operations;

determining a remedial course of guidance for returning to the actual course of travel from the shadow mode course of travel; and developing at least one revision of instructions stored on a memory for execution by a processor to conduct shadow mode autonomous guidance of the autonomous transportation vehicle based on the remedial course of guidance to train the control system according to the artificial perception.

18. The method of claim 17, wherein augmenting the at least one captured image includes estimating image augmentation corresponding to actualization of the shadow mode autonomous guidance operations from the perspective of the image capture device according to the at least one captured image.

19. The method of claim 18, wherein augmenting the at least one capture image includes generating augmented image data based on the estimated image augmentation.

20. The method of claim 17, wherein the instructions form at least a portion of a neural network and revising the instructions includes training the neural network.

21. An autonomous transportation vehicle, comprising:
a vehicle base including a chassis and a drive system, the drive system comprising a lateral guidance apparatus for providing steering of the vehicle base and a drive train coupled with the chassis to provide propulsion to the vehicle base;
an image capture device coupled with the vehicle base to capture images during operation of the autonomous transportation vehicle; and
a control system for providing autonomous guidance of the drive system, the control system including at least one processor for executing instructions stored on a memory for conducting drive system operations autonomously, wherein the control system is configured to receive one or more images from the image capture device indicating an actual course of travel of the autonomous transportation vehicle, to augment at least one of the one or more images to impose an artificial perception of an augmented course of travel of the autonomous transportation vehicle, to determine a remedial course of travel for returning to the actual course of travel from the augmented course of travel, and to determine at least revision of instructions based on the remedial course of travel to train the control system according to the artificial perception, wherein configuration to augment at least one of the capture images includes augmenting at least one of the captured images by at least one of lateral shift and yaw shift.

22. The autonomous transportation vehicle of claim 21, wherein configuration to augment the at least one image includes augmenting the at least one image to have hazardous conditions including steering to guide the autonomous transportation vehicle beyond lane markings of a roadway on which the autonomous transportation vehicle operates as within the artificial perception.

23. The autonomous transportation vehicle of claim 21, wherein configuration to augment the at least one image includes augmenting the at least one image to have hazardous conditions including steering to guide the autonomous transportation vehicle to have yaw out of parallel with lane markings of a roadway on which the autonomous transportation vehicle operates as within the artificial perception.

24. The autonomous transportation vehicle of claim 21, wherein the instructions form at least a portion of a neural network.

25. An autonomous transportation vehicle, comprising:
a vehicle base including a chassis and a drive system, the drive system comprising a steering system for providing lateral steering adjustment of the vehicle base and a drive train coupled with the chassis to provide propulsion of the vehicle base;
an image capture device coupled with the vehicle base to capture images during operation of the autonomous transportation vehicle; and
means for conducting shadow mode autonomous guidance of the drive system including generating simulated autonomous guidance of the drive system while a human driver conducts actual guidance of the drive system, for determining shadow mode autonomous guidance operations, for receiving one or more captured images from the image capture device indicating an actual course of travel of the autonomous transportation vehicle, for augmenting at least one of the one or more captured images to impose an artificial perception of a shadow mode course of travel corresponding to actualization of the shadow mode autonomous guidance of the drive system, for determining a remedial course of travel for returning to the actual course of travel from the shadow mode course of travel, and for determining at least one revision to instructions based on the remedial course of travel to train the means according to the artificial perception,
wherein the means is configured to determine an amount of deviation between the shadow mode course of travel corresponding to actualization of the shadow mode autonomous guidance of the drive system and the actual course of travel conducted by the human driver, based on comparison between each of the captured images and the corresponding augmented captured image, to determine whether the amount of deviation exceeds a threshold deviation, and to record each exceedance of the threshold deviation as a disengagement.

* * * * *